United States Patent [19]

Woodell

[11] 4,171,825
[45] Oct. 23, 1979

[54] STEERABLE TOWING DEVICE

[75] Inventor: Arthur A. Woodell, Buellton, Calif.

[73] Assignee: Robby Robinson, Santa Maria, Calif.

[21] Appl. No.: 876,871

[22] Filed: Feb. 13, 1978

Related U.S. Application Data

[63] Continuation-in-part of Ser. No. 742,460, Nov. 17, 1976, abandoned.

[51] Int. Cl.$^2$ ............................................. B62D 13/04
[52] U.S. Cl. ...................................... 280/443; 280/103
[58] Field of Search ............... 280/443, 103, 93, 95 A, 280/98, 442, 444

[56] References Cited

U.S. PATENT DOCUMENTS

| | | | |
|---|---|---|---|
| 2,100,447 | 11/1937 | Mahaffey | 280/443 |
| 2,450,215 | 9/1948 | Wilson | 280/443 |
| 2,533,553 | 12/1950 | Burns | 280/443 |
| 3,876,240 | 4/1975 | Watson | 280/443 |
| 3,888,515 | 6/1975 | Winter | 280/476 R |

*Primary Examiner*—Philip Goodman
*Attorney, Agent, or Firm*—Daniel J. Meaney, Jr.

[57] ABSTRACT

A steerable towing device having at least two wheels, a frame, a tongue having at one end a socket adapted for connection to a first ball on a towing means and having the other end connected to said frame, at least two axially aligned wheels, a steering assembly having a bifurcated steering crank having a center pivot point and two extended arms of predetermined length extending from the center pivot point with the extended arms having an obtuse angle therebetween, a steering arm having at one end a socket for connection to a second ball on a towing vehicle spaced a selected distance from the first ball and the other end of the steering arm being pivotally connected to the end of one extended arm of the bifurcated crank, a connecting rod pivotally connected to the end of the other extended arm and a steering assembly which includes an integral drag arm and a tie rod connecting arm connected to steer one of the two axially aligned wheels and a separate tie rod connecting arm connected to steer the other of the two axially aligned wheels with each end of the tie rod connecting arms pivotally attached to a tie rod and the end of the drag arm pivotally attached to the connecting rod and wherein the steering assembly is responsive to rotation of the bifurcated steering crank to turn each wheel through a different arcuate motion in unison causing the steerable towing device to follow the towing vehicle through any turn, is shown.

17 Claims, 13 Drawing Figures

STEERABLE TOWING DEVICE

This is a continuation-in-part of application Ser. No. 742,460, filed Nov. 17, 1976, now abandoned.

BACKGROUND OF THE INVENTION

1. Field of the Invention

This invention relates to a new and novel steerable towing device adapted to be interconnected between a towing means, such as for example, a towing vehicle having spaced two ball hitches, and a towable load, such as for example, a conventional two wheel trailer or tandem steerable four wheel trailer. In addition, this invention may be used in a steerable four wheel trailer wherein the steerable towing device functions as the front axle of the trailer. The four wheel trailer is likewise connected to a towing means through a spaced two ball hitch. During pulling by a towing means, a trailer experiences movement in directions generally referred as yaw, pitch and roll.

2. Disclosure of the Prior Art

It is known in the art to utilize a steerable wheel assembly in a tow dolly or steerable trailer.

U.S. Pat. No. 2,450,215 (Wilson) discloses a dolly for trailer which has a "V" shaped axle and steering assembly, which steering assembly is controlled by a steering crank having an acute angle between the arms of the steering crank. The towed vehicle loading point is forward of the center line of the wheels and behind the pivot point of the steering crank.

U.S. Pat. No. 3,613,921 (Ryden) discloses a tow dolly for wheeled vehicles. The tow dolly is formed of a chassis having a pair of towed vehicle wheel ramps, surge braking and linked steering mechanisms for turning the two dolly wheels. The steering mechanism has a bell crank formed of two arms of unequal length and having a 90° angle therebetween. The long arm is responsive to a steering arm connected to the towing vehicle and the short arm directly moves a tie rod between the wheel steering assembly.

U.S. Pat. No. 3,876,240 (Watson) discloses a steerable four wheel trailer to be pulled behind a towing vehicle having a two ball hitch. The trailer steering mechanism has a bell crank formed of two arms of unequal length having a 90° angle therebetween. The long arm of the bell crank is connected to a steering arm extending from the towing vehicle. The short arm of the bell crank is connected to a connecting rod forming part of the steering assembly of the trailer. The pivot point of the bell crank is located between the center line of the axle towards the towing vehicle. Based on the geometry of the disclosure of Watson, during a left or right turn, the steering assembly functions only to turn both wheels in exactly the same arc of rotation and keeps both wheels parallel to each other at all times. There is no loading point on the front axle, but rather a trailer is directly fixedly connected to the front axle by leaf springs and shock absorbers.

SUMMARY OF THE INVENTION

The present invention provides for a steerable towing device having two axially aligned wheels which turn together in response to a towing means pulling it through a turn. In the preferred embodiment, the steerable towing device has a towed vehicle removeably coupled thereto and the towed vehicle is likewise pulled through the same turn as a towing vehicle.

In the preferred embodiment of this invention, the towed vehicle is connected to the steerable towing device in a manner such that movement of the steerable towing device in relation to the towed vehicle is restricted in a pitch and yaw direction and movement is permitted in a roll direction.

In the preferred embodiment, the steerable towing device has a frame and an axle assembly operatively coupled to the frame. The axle assembly supports the axially aligned wheels. A tongue has a socket at one end for receiving a ball type hitch attached to a towing means and the other end of the tongue is connected to the frame.

A bifurcated steering crank having two arms of predetermined length extending from a center pivot point and having a selected obtuse angle therebetween is disclosed. The bifurcated steering crank is pivotally mounted between the frame and axle assembly with the center pivot point being in substantial alignment with the center line of and equidistant between the two axially aligned wheels.

An elongated steering arm extends outwardly and forwardly toward the towing means and has one end pivotally connected to the end of one of the extended arms. The other end of the elongated steering arm has a socket for receiving a second ball type hitch attached to a towing means in a spaced relation to the first ball. A steering assembly having a connecting rod and tie rod are operatively connected to the wheels. The connecting rod is pivotally connected to the end of the other arm of the bell crank. Rotation of the bifurcated steering crank in response to longitudinal movement of the elongated steering arm causes each wheel to turn in a separate arcuate motion to enable the steerable towing device to track or follow the towing vehicle through a turn.

A first connecting point, such as a ball type trailer hitch connection, is located centrally on the frame. The connecting point is positioned in alignment with the center pivot point of the bifurcated steering crank. Thus, a towed vehicle is removeably connected to the frame at the first connecting point and when so connected follows the towing vehicle and steerable towing device through a turn.

A second connecting point, such as a pivot pin and a pivot socket, is positioned between the frame and towed device. In this embodiment, the pivot pin is located on the frame while the pivot socket which pivotally removeably receives the pivot pin is located on the towed device. This second connecting point functions to restrict the movement of the steerable towing device relative to the towed device in the pitch and yaw direction.

The present invention overcame several deficiencies of the known prior art. One deficiency is that the loading of the towed vehicle or trailer in the prior art onto a towing dolly results in the loading points, center lines of the axle and pivot points of the steering arm cranks being off alignment thereby establishing unbalanced or uneven loading on the steering assembly and the towing vehicle.

In the present invention, the center lines of the axle, at a point equidistant between the axially aligned wheels, the center pivot point of the bifurcated steering crank and the first connecting point are in alignment. This eliminates unbalanced and uneven loading on the components of the steerable towing device which is encountered especially in sharp right or left turns.

In the prior art disclosure of U.S. Pat. No. 3,876,240 (Watson), the arc of rotation of the bell crank is the same for a hard right turn and hard left turn. Thus, in the steerable four wheel trailer device of Watson, both wheels turn or are rotated through an arc of rotation which is the same when traversing a soft or hard right or left turn. In a hard right or hard left turn, steerable trailer of U.S. Pat. No. 3,876,240 (Watson) would experience scrubbing or jumping of the wheels in a turn because the steering geometry does not permit the inner wheel in a turn to be rotated through a greater arc of rotation than the outer wheel. Because of the 90° angle between the arms of the bell crank in the steerable trailer, equal turn movement is experienced in a right or left turn resulting in equal turning of the wheels producing the result described above. In addition to the above, Watson steerable trailer is joined to the frame through a narrow pivot pin which, compared to the length of the single tongue, introduces an instability to the towed device in that a slight amount of play or looseness between the end of the tongue and the pivot pin results in a larger lateral movement of the end of the tongue at the towing means.

In Wilson, the dolly is coupled to the towed load through a single ball-socket hitch and a pair of flexible cables. This results in unwanted lateral movement of the dolly relative to the towed device which introduces instability therebetween.

The present invention overcame these deficiencies in the known prior art because of the bifurcated steering crank having a center pivot point and two arms of a predetermined length having a selected obtuse angle therebetween. The selected obtuse angle is determined by the geometry of the steering components of the front and assembly. The predetermined length of the bifurcated steering arm is determined by the length of the drag arm in the steering assembly and spacing between the two ball hitches located on a towing means.

The optimum obtuse angle permits the bifurcated steering crank to be responsive to linear longitudinal movement of the elongated steering arm to translate such motion into different arcuate motions being applied to each wheel. This results in the inner and outer wheel remaining at right angles to a projected center point of a turn radius, i.e. the inner wheel in either a left or right turn will turn more than the outer wheel.

Thus, one advantage of the steerable towing device of the present invention is that the device is steered through or tracks through the exact turn of a towing vehicle without any scrubbing or wheel jumping due to parallel wheels.

Another advantage of the present invention is that the downward loading forces of the towed vehicle are supported through the connecting point, the pivot point of the bifurcated steering crank and axle. This reduces the loading on the rear of the towing vehicle.

Yet another advantage of the present invention is that the axle is joined to the frame through a leaf spring wherein the connecting points of the leaf spring apply a selected positive castor to the wheel assembly which causes the steerable towing device to track the towing means moving straight ahead, even if the extended steering arm became disengaged.

In the preferred embodiment of the invention, the towed device is a two wheel trailer having a trailer hitch adapted for connection to a ball joint on a towing means. Generally, a two wheel trailer has a three point suspension system formed of the ball-socket hitch, which functions as one suspension point, and the two wheels which function as the other two suspension points. Thus, the steerable towing device of the present invention maintains the same three point suspension system thereby avoiding introduction of undesirable torsional stress forces to the towed device.

When the steerable towing device is used in a four wheel trailer application, the towed device utilizes a four point suspension system formed of the four wheels. In such applications, the towed device itself would be designed to withstand torsional stress forces which would be applied to the frame.

In the steerable towing device, the tongue and extended steering arm are pivotally connected to the frame. This results in the additional advantage that vertical movement between the towing means and the steerable towing device is permitted without introduction of any steering movement or forces to the steering assembly.

BRIEF DESCRIPTION OF THE DRAWING

The foregoing and other advantages and features of the invention will be apparent from the following description of the preferred embodiment of the invention when considered together with the illustrations in the accompanying drawing and includes the following figures:

FIGS. 11(a), 11(b) and 11(c) are a series of pictorial representations of the steering assembly in a straight, hard left turn and hard right turn, respectively. Similar numbers refer to similar elements throughout the drawing.

DESCRIPTION OF THE PREFERRED EMBODIMENT

Figure 1:
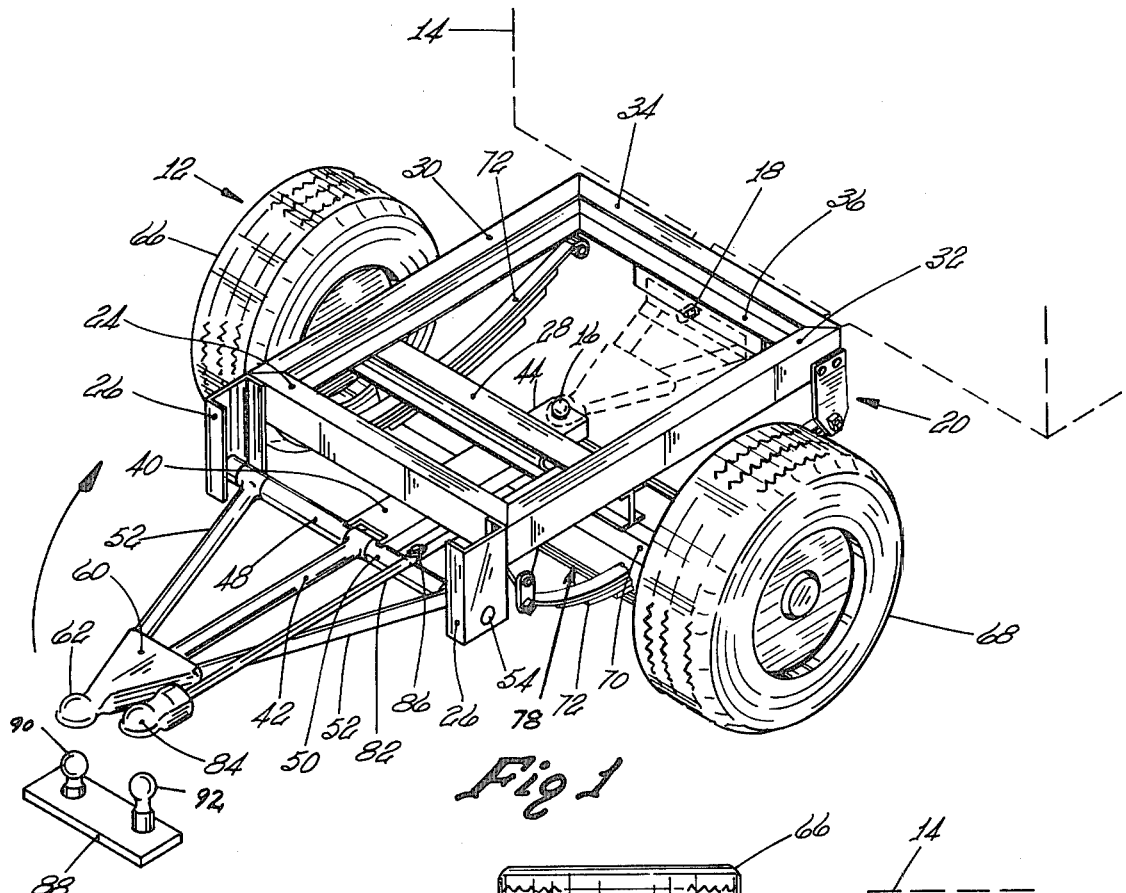
FIG. 1 is a perspective front view of a steerable towing device.

FIG. 1 shows a steerable towing device, generally designated as 12, having removeably attached thereto a towed vehicle, shown in phantom or by dashed lines 14. The towed vehicle 14 is coupled to the steerable towing device 12 by means of two connecting points. The first connecting point, such as a ball-socket hitch 16, is located centrally on or as an interior support point on the steerable towing device 12 and the second connecting point, such as a decoupling means which is shown as a pivot pin-pivot socket assembly 18, is located between the first connecting point and the towed device 14.

The steerable towing device 12 has a frame 20 having at least one exterior section, such as front frame member 24 having a portion of which extends below the frame 20. In FIG. 1, front frame member 24 has a pair of "U" shaped channelled members 26 rigidly attached thereto and extending below the frame 20.

A center "I" beam support member 28 extends between frame side support members 30 and 32. The frame 20 has a back or rear frame member 34 which has an "L" shaped support member 36 located thereunder. The pivot-pin component of the pivot pin-pivot socket assembly 18 is attached to member 36, an elongated towing member formed of two components, a rigid plate 40 and an extended pivotally mounted tongue 42 is positioned to extend from the interior support point, the ball-socket hitch 16, under the frame 20, and past front frame member 24.

Rigid plate 40 is attached to support member 28 and is positioned such at a portion 44 of the plate 40 extending beyond member 28 towards the rear frame member 34. The ball component of the ball-socket hitch 16 is mounted onto the extend plate portion 44.

The other end of plate 40 is affixed to two cylindrically shaped guides 48 and 50.

A "V" shaped draw bar having side member 52 is positioned to have the open ends thereof pivotally mounted in alignment with the end of tongue 42, and guides 48 and 50. An elongated pivot pin 54 extends from the channel member 54, through the pivotal ends of draw bar side members 52 through the guides 48 and 50 and the pivotal end of tongue 42.

The draw bar side member 52 and tongue 42 have the other ends thereof joined together to form attaching end 60 which terminates in a socket 62. This arrangement permits the combined tongue 42 - draw bar side member 52 assembly to pivot around pin 54.

The frame 20 supports a pair of axially aligned, steerable wheels 66 and 68. The wheels 66 and 68, in this embodiment, are supported by an axle assembly 70. However, any type of support may be used, or, the wheels 66 and 68 could be independently supported in axial alignment. The axle assembly 70 is attached to and supported by a leaf spring assembly 72. The leaf spring assembly 72 is connected to frame member 30 and 32 and to axle assembly 70 in such a manner, i.e. the front of the leaf spring assembly 70 is lower than the back, to apply a selective positive castor to the wheels 66 and 68.

A steering assembly 78 is interconnected between the wheels 66 and 68 as shown in greater detail in FIGS. 2, 4, 5 and 7. The steering assembly has a bifurcated steering crank 80 (shown in FIG. 2) which forms an integral part of the device as explained in greater detail with respect to FIGS. 2, 4, 5, 7 and 9 and 11(a), 11(b) and 11(c).

The bifurcated crank arm 80 is pivotally connected to a steering member 82 which extends substantially parallel to the towing member formed of plate 40 and tongue 42. The other end of the steering member 82 is terminated in an attaching end which, in this embodiment, is a socket 84 adapted to receive a ball connected to a towing vehicle.

Steering member 82 has a center pivot point 86 to permit the steering member 82 to be pivoted and displaced as the tongue 42 and draw bar side member 52 are pivoted around pin 54.

The towing means and means for supporting a two ball hitch on the towing means is generally represented by solid rectangle ball plate 88.

Ball plate 88 has first ball represented by ball 90 and a second spaced ball 92. The distance between the balls 90 and 92 is known, and can be between 6 inches to 12 inches. The second ball 92 is mounted at a slightly higher elevation than the first ball 90 to accommodate for the steering member 82 being positioned above tongue 42.

The support member 28 has an elliptical shape opening 94 to permit member 82 to extend therethrough to join the bifurcated crank arm 80.

Figure 2:
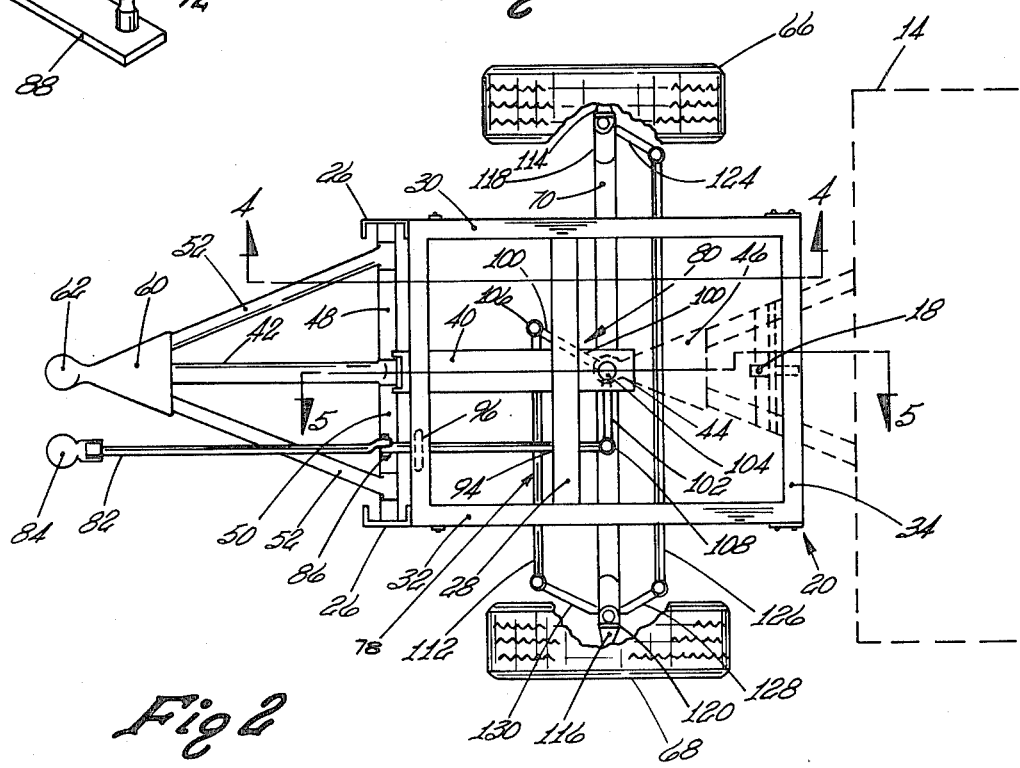
FIG. 2 is a top view of one embodiment of a steerable towing device.

FIG. 2 shows the components forming the steering assembly 78 in greater detail. The steering member 82 is moveably supported under front frame member 24 by a guide member 96. In addition, elliptical shaped opening 94 permits the steering member 84 to pass through support member 28.

The steering member 82 is connected to bifurcated steering crank 80 in the following manner. The bifurcated steering crank 80 has a first extended arm 100 and a second extended arm 102. The length of each extended arm 100 and 102 is of predetermined length and is determined by two dimensional components as detailed below. The two extended arms 102 and 100 extend from a center pivot point 104. The extended arms have a selected obtuse angle therebetween which is greater than 90° and less than 180°. The bifurcated steering crank is pivotally mounted between the frame 20 and axle 70 with the center pivot 104 being in alignment with the center line of the axle and equidistant between the two axially aligned wheels 66 and 68. In addition, the ball socket assembly 16 is likewise in alignment with the center pivot point 104.

The first extended arm 100 has a pivot point 106 at the end thereof while the second extended arm 102 has a pivot point 108 at the end thereof. The steering member 82 is pivotally connected to the second extended arm 102 at pivot point 108 such that movement of the steering member 82 in a longitudinal direction provides a linear, longitudinal movement of second extended arm 102 in a longitudinal direction.

The bifurcated steering crank 80 is connected to one end of a connecting rod 112 at pivotal end 106 of the first extended arm 100.

Each wheel 66 and 68 is rotatably supported on a spindle 114 and 116, respectively, which, in turn, is steerably mounted in a well known king pin steering assembly 118 and 120, respectively.

In the embodiment of FIG. 2, wheel 66 is supported by spindle 114 through king pin assembly 118 and has a tie rod connecting arm 124 which is pivotally mounted to cooperate with a tie rod 126.

Wheel 68 is supported by spindle 116 through king pin assembly 120 and has a tie rod connecting arm 128 which is pivotally mounted to cooperate with tie rod 126. In addition, king pin assembly 120 has a drag arm 130 which is pivotally connected to the other end of connecting rod 112.

The predetermined length of each extended arm 100 and 102 is determined by the geometry of the following factors. The length of the first arm 100 is substantially the same length as the drag arm 130 and is substantially parallel to the resultant line extending from the center of the king pin assembly 120 to the pivot point where connecting rod 112 joins drag arm 130.

The length of the second extended arm 102 is determined by the spacing between socket 62 on attaching end 62 and the socket 84 on connecting rod 82. This spacing is determined in turn, by the fixed spacing on the towing means as depicted by 88 in FIG. 1.

Generally, the geometry of these factors is selected such that the lengths of each extended arm are substantially equal and the optimum obtuse angle is about 120°.

Figure 3:
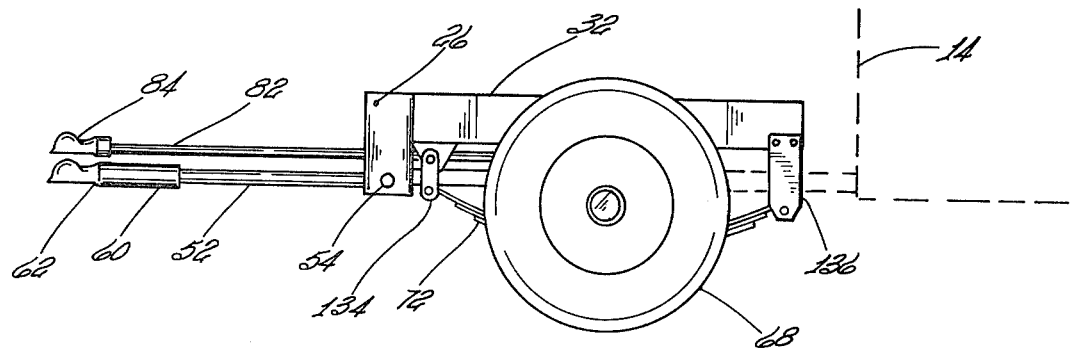
FIG. 3 is a side view of the embodiment of the steerable towing device shown in FIG. 2.

FIG. 3 shows that the steering arm 82 extends above and substantially parallel to tongue 42 and draw bar side member 52. Socket 84 is shown positioned above socket 62.

The leaf spring 72 is joined to frame side support member 32 by a front hanger 134 and a rear hanger 136. Front hanger 134 is positioned and spaced higher from frame side support member 32 relative to rear hanger 136 in order to position wheel 68 with a selected negative castor. The resultant selected negative castor functions to cause wheel 68 to steer or track the towing means even if the extended steering arm became disengaged, provided that the movement is forward. The leaf spring 72 on wheel 66 functions in a similar manner.

Figure 4:
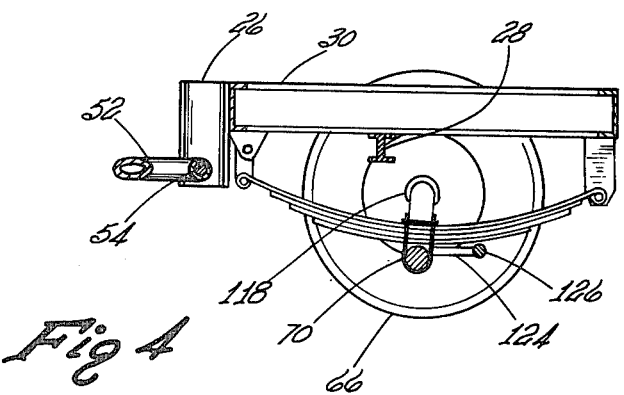
FIG. 4 is a sectional view taken along section lines 4—4 of FIG. 2.

FIG. 4 shows the relationship between draw bar side member 52, guide 48 and pin 54. In addition, the relationship between the king pin assembly 118, the tie rod connecting arm 124 and axle 70 is shown. It should be noted that in this embodiment, the leaf springs 72 are above the axle 70.

Figure 5:
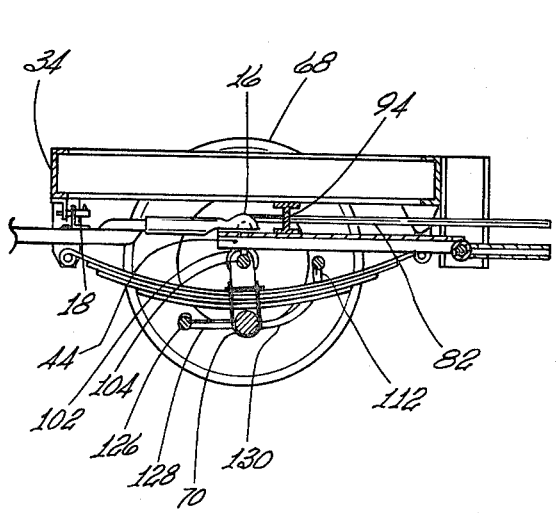
FIG. 5 is a reversed sectional view taken along section lines 5—5 of FIG. 2.

FIG. 5 is a section which is reversed relative to FIG. 2. The relationship between the ball-socket assembly 16 and pivot pin-pivot socket assembly 18 is shown. Also, the pivot point 104 on bifurcated steering crank 80 is shown in alignment with the center line of axle 70. The steering arm 82, the connecting rod 112 and bifurcated steering crank arm 100 is shown. The actual geometry is illustrated in greater detail in FIG. 8.

Figure 6:
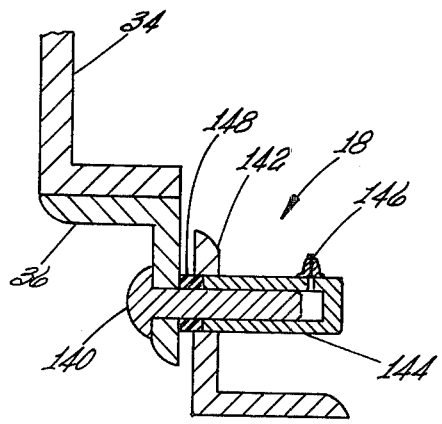
FIG. 6 is an exploded view in cross-section of a decoupling means in the form of a pivot pin and socket assembly adapted to removeably connect a towed device to the steerable towing device.

FIG. 6 shows the details of one embodiment of the pivot pin-pivot socket assembly 18. Rear frame member 34 and support member 36 are part of frame 20 and support a fixed pin 140. The frame of a towed vehicle, depicted by "L" shaped member 142, supports a pin socket 144 in axial alignment with pin 140. A zerk grease fitting 146 is used to apply grease to the pin-socket assembly 18. A grease seal 148 positioned between members 36 and 142 and enclosing pin 140 functions to hold the lubricant between pin 140 and socket 144.

Figure 7:
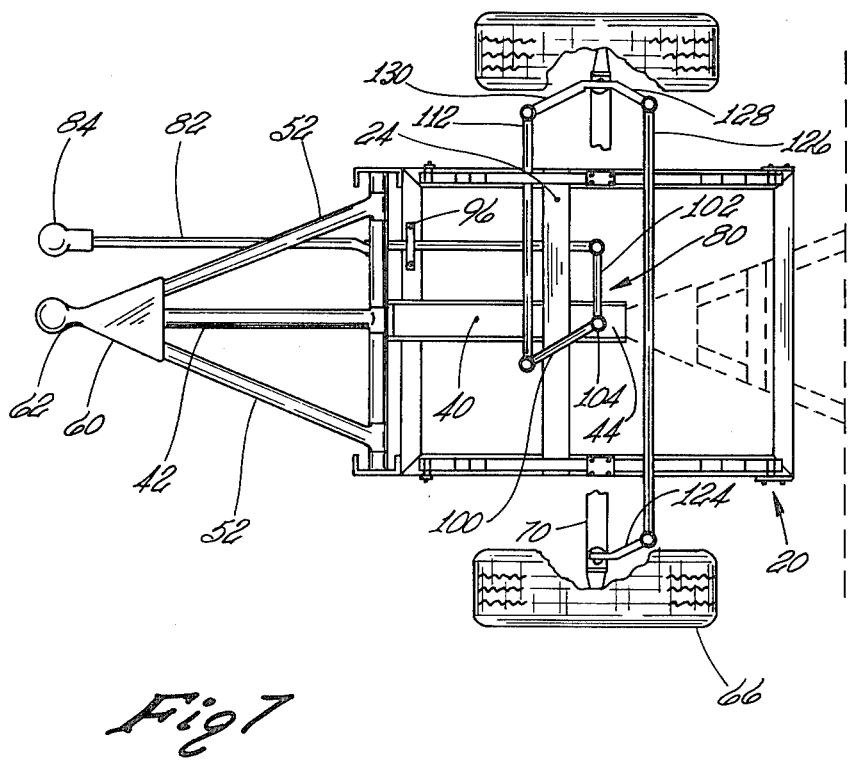
FIG. 7 is a bottom view of the steerable towing device of FIG. 2.

FIG. 7 illustrates the relationship between the bifurcated steering crank 80, steering arm 82, first extended arm 102, second extended arm 100, connecting rod 112 and tie rod 126. Generally, tie rod 126 extends substantially parallel to the center line of axle 70 when the wheels 64 and 66 are being steered straight ahead.

Steering member 82 likewise extends from the interior of frame 20, through member 24, guide 96, in a substantially parallel relationship with tongue 42 and plate 40. Center pivot point 104 on bifurcated steering crank 80 is in alignment with the ball-socket assembly 16.

Figure 8:
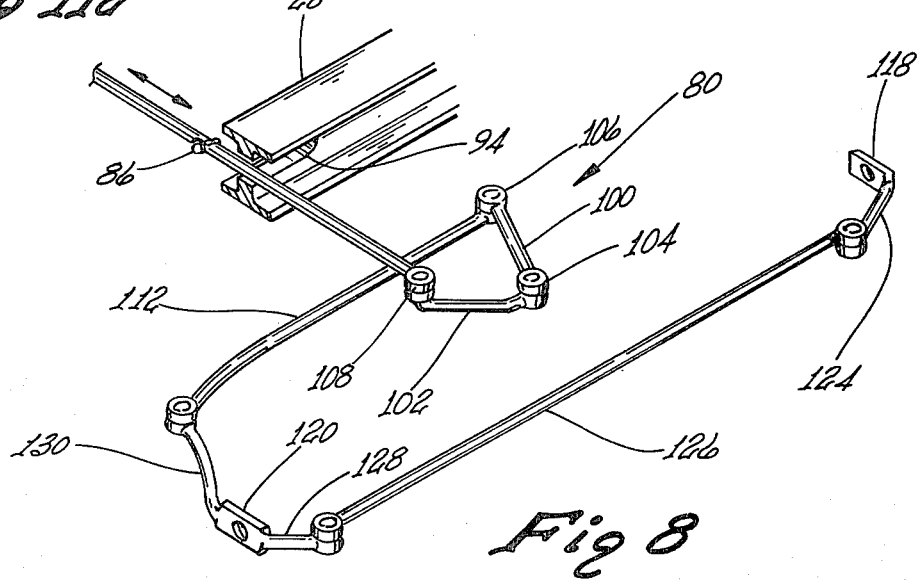
FIG. 8 is a prospective schematic isometric drawing of the steering linkage assembly of the present invention.

FIG. 8 shows the shape and relationship of the various components of the steering assembly 80 and steering arm 82.

When the towing means executes a left turn, a rearward displacement or pushing longitudinal force is applied via socket 84 to steering arm 82. The steering arm 82 moves through opening 94 in member 28 causing bifurcated steering crank 80 to be rotated counterclockwise. The pivot point at the end of extended arm 102 moves linearly rearward in a longitudinal direction and in a displacement equal to that of the steering arm in the rearward longitudinal direction.

The bifurcated crank 80 rotates counterclockwise about pivot point 104 causing the end of the first extended arm 100 to move in a linear arc motion and direction pushing connecting rod 112 to the left pushing the end of drag arm 130 through an arcuate motion to turn wheel 68 to the left through king pin assembly 120. Tie rod connecting arm 128 pushes tie rod 126 towards wheel 66 causing tie rod connecting arm 124 to turn wheel 66 to the left through king pin assembly 118. On a left turn, wheel 68 turns sharper to the left than wheel 66. The wheels are not parallel due to the selected angles of the tie rod connecting arms 124 and 128 in relation to spindles 114 and 116. The arcuate motion traversed by drag arm 130 is a result of the obtuse angle between extended arms 100 and 102.

When the towing means executes a right turn, a forward displacement or pulling longitudinal force is applied via socket 84 to steering arm 82. The steering arm 82 moves forward through opening 94 in member 28 causing the bifurcated steering crank 80 to be rotated clockwise. The end of second extended arm 102 is pulled forward in a linear, longitudinal direction and in a displacement equal to the forward longitudinal displacement of steering arm 82.

The bifurcated steering crank 80 rotates clockwise about pivot point 104 causing the end of the first extended arm 100 to move in a linear arc motion and direction pulling connecting rod 112 to the right pulling the end of drag arm 130 through an arcuate motion to turn wheel 68 to the right through king pin assembly 120. Tie rod connecting arm 128 pulls tie rod 126 away from wheel 66 causing tie rod connecting arm 124 to turn wheel 66 to the right through king pin assembly 118. On a right turn, wheel 66 turns sharper to the right than wheel 68.

In the embodiment of FIG. 8, the lateral displacement of the end of drag arm 130 in an extreme left turn is about 6 inches while in an extreme right turn it is about 4 inches.

Figure 10:
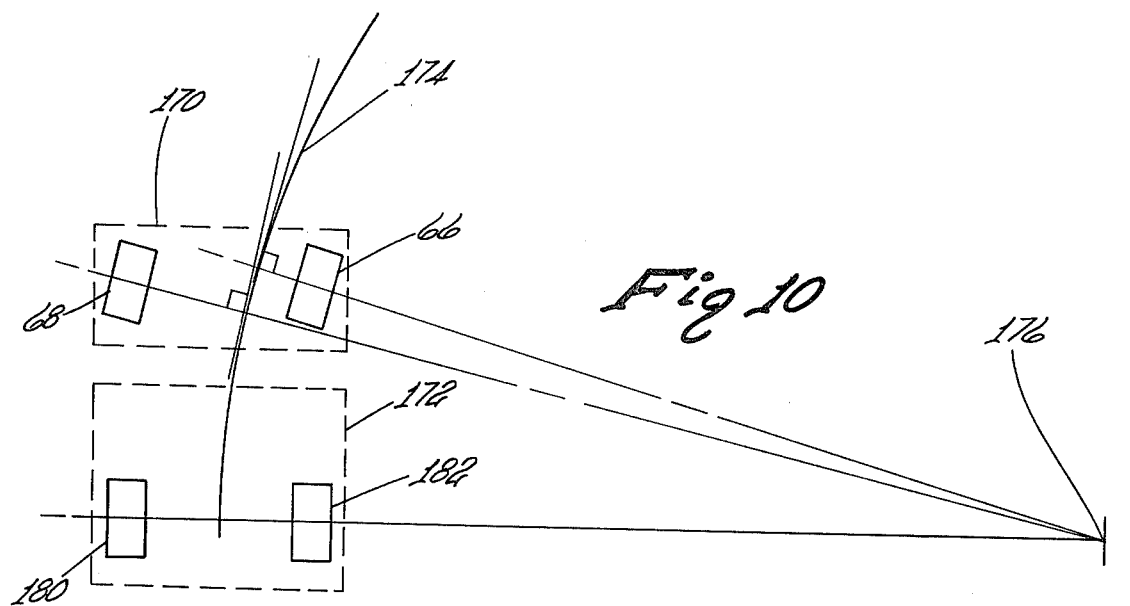
FIG. 10 is a pictorial representation of a turning steerable towable device and two wheel trailer through a right turn.

FIG. 10 illustrates pictorially the turning angles of each wheel of the steerable towing device in a right turn. The steerable towing device is represented by dashed lines 170, while the towed vehicle is represented by dashed lines 172. The predetermined path of the right turn is shown by arc section 174 and the projected center of the curve is shown by point 176.

Outer wheel 68 and inner wheel 66 are steered, as described in FIG. 8, into the turn such that each wheel is perpendicular to the radius of the curve. Thus, in order to maintain this relationship, the inner wheel 66 must be turned sharper relative to the outer wheel 68.

Wheels 180 and 182 of towed vehicle 172 remain parallel to each other and perpendicular to the center 176.

From the pictorial representation of FIG. 10, it is readily apparent that each wheel 66 and 68 could be independently mounted on the steerable towing device 170 thereby avoiding the necessity of an axle assembly.

Figure 9:
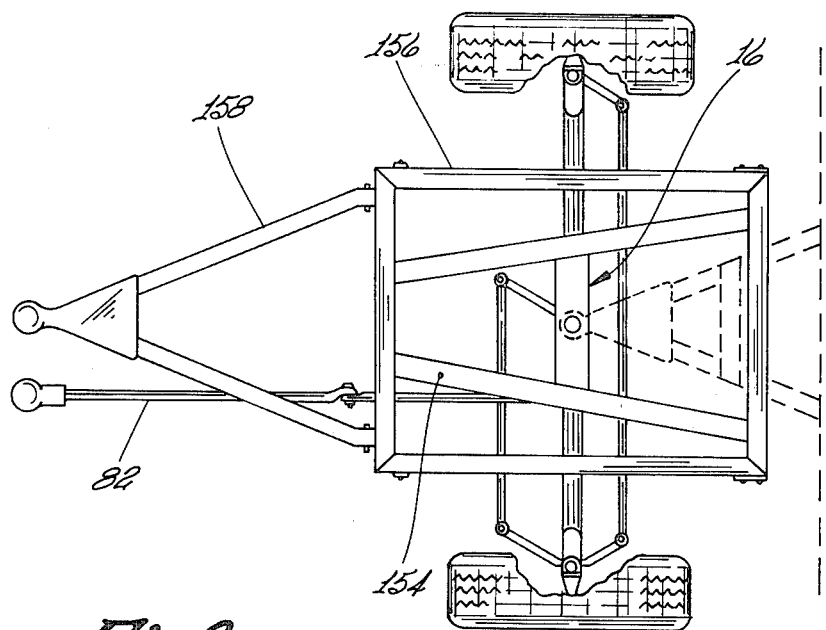
FIG. 9 is a top view of another embodiment of the steerable towing device having a "V" shaped draw bar and an "A" shaped ball hitch support.

FIG. 9 is another embodiment of a steerable towing device. The interior support for the ball-socket assembly 16 is in the form of an "A" shaped interior frame shown generally as 154 on frame 156. The ball-socket assembly 16 the center pivot point of the bifurcated steering crank are in alignment with each other and the center line of the axle and located equidistant therebetween. A "V" shaped draw bar 158 is pivotally attached to frame 156. Steering arm 82 is spaced below frame 156 and draw bar 158.

Figure 11A:
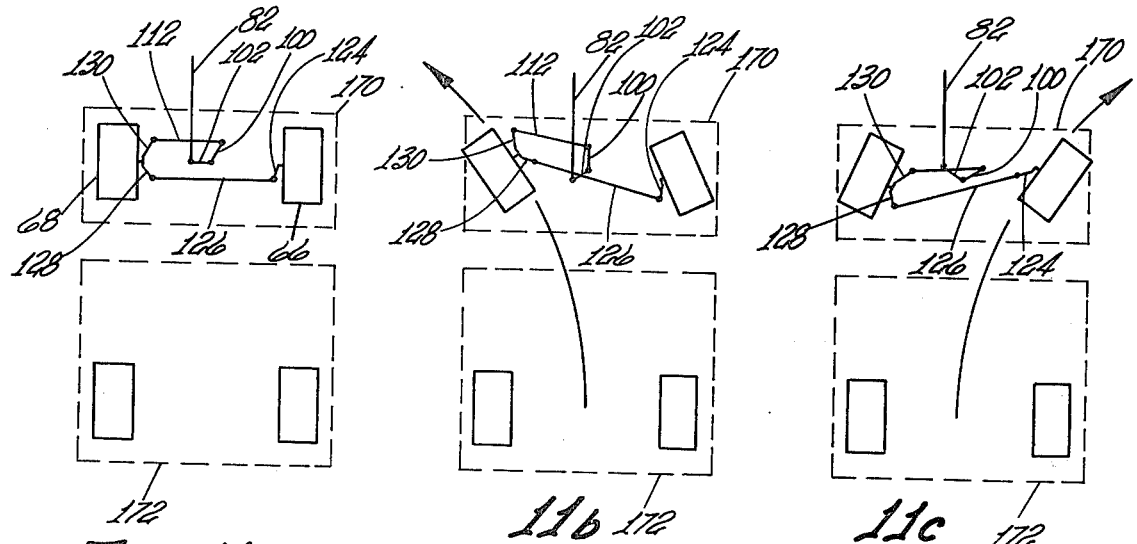

FIGS. 11(a), 11(b), and 11(c) show schematically the geometry and position of the steering arm 82, first and second extended arms 100 and 102 respectively, the connecting arm 112, drag arm 130, tie rod connecting arms 128 and 124 respectively, and tie rod 126 when the steerable towing device is steered straight, hard left and hard right respectively. Note that the wheels are turning in unison but that the inner wheel is turned sharper than the outer wheel in a turn. Also, the selected obtuse angle enables the same amount of linear motion in the longitudinal direction to be converted into the appropriate arcuate motion and direction so as to positively cause the steerable towing device to track the towing means and to pull the towed vehicle through the turn.

In addition, the wheels 66 and 68 need not be supported by any particular type of suspension system. In particular, a ball joint or any other type of suspension system may be utilized.

What is claimed is:

1. A steerable towing device having at least two wheels, a frame, a tongue pivotally connected to said frame and two axially aligned wheels comprising
    a bifurcated steering crank having first and second arms of predetermined lengths extending from a center pivot point and having a selected obtuse angle therebetween, said bifurcated steering crank being pivotally mounted between the frame and axially aligned wheels with the center pivot point thereof in alignment with the center line of and equidistant between the two axially aligned wheels;
    a steering arm pivotally attached to the end of the first arm and extending from said frame in a direction substantially parallel to and spaced from the tongue;
    a steering assembly having
    a connecting rod having one end thereof pivotally attached to the end of the second arm;
    an integral drag arm and tie rod connecting arm assembly with the end of the drag arm positioned opposite the end of the tie rod connecting arm being positioned at an acute angle from the center line of the two axially wheels for steering one of the two wheels; said end of the drag arm being pivotally connected to the other end of the connecting rod;
    a tie rod connecting arm positioned at an acute angle from the center line of the two axially aligned wheels with the end of the tie rod connecting arm extending in a direction opposite to the drag arm for steering the other of the two wheels; and
    a tie rod extending between the ends of each tie rod connecting arm;
    said predetermined lengths of said first and second arms being determined by the length of the drag arm and the horizontal spacing between the tongue and steering arm, respectively, and wherein said obtuse angle is selected by positioning said first arm parallel to the drag arm.

2. The steerable towing device of claim 1 wherein the predetermined lengths of said first and second arms are substantially equal and the length of the drag arm is equal to the length of the first arm.

3. The steerable towing device of claim 1 comprising a connecting ball located on said frame and positioned in alignment with the center pivot point of said bifurcated steering crank and center line of the axially aligned wheels, said connecting ball being adapted to have a towed vehicle removeably connected thereto to pull a towed vehicle in response to a towing means through a turn.

4. The steerable towing device of claim 2 further comprising
    an axle for supporting said wheels; and
    leaf spring means operatively coupled to the frame for supporting the axle, said leaf spring means being coupled to the frame and front axle to provide a selected, negative castor to the two axially aligned wheels.

5. The steerable towing device of claim 2 wherein the selected obtuse angle between the two arms is greater than 90° and less than 180°.

6. The steerable towing device of claim 5 wherein the selected obtuse angle is about 120°.

7. A steerable towing device having a steering assembly and two axially aligned wheels which turn together in response to a towing means pulling it through a turn comprising
    a frame and axle assembly operatively coupled to said frame for supporting said axially aligned wheels;
    a tongue having a socket at one end thereof for receiving a ball type hitch of a towing means and having the other end of the tongue being pivotally attached to the frame;
    a bifurcated steering crack having two arms of substantially equal length extending from a center pivot point and having a selected obtuse angle therebetween, said bifurcated steering crank being pivotally mounted between the frame and axle assembly with the center pivot being in substantial alignment with the center line of the axle assembly and equidistant between said two axially aligned wheels;
    an elongated steering arm extending outwardly and forwardly from the frame toward the towing means, said elongated arm having a pivot point extending to the exterior of the frame and having one end pivotally connected to the end of one of the arms and having at the other end of the elongated steering arm a socket for receiving a ball type hitch attached to said towing means, said elongated steering arm being capable of movement in a longitudinal direction;
    a connecting rod having two ends, one end being pivotally attached to the end of the other of the two arms;
    an integral drag arm and tie rod connecting arm assembly with the end of the drag arm positioned opposite the end of the tie rod connecting arm and with each of said drag arm and tie rod connecting arm being positioned at an acute angle from the center line of the two axially aligned wheels for steering one of the two wheels; said end of the drag arm being pivotally connected to the other end of the connecting rod and positioned parallel to said other of the two arms;
    a tie rod connecting arm positioned at an acute angle from the center line of the two axially aligned wheels with the end of the tie rod connecting arm extending in a direction opposite to the drag arm for steering the other of the two wheels; and
    a tie rod forming part of a said steering assembly and extending between and pivotally connected to the ends of each tie rod connecting arm, said tie rod being responsive to turn the other of the two axially aligned wheels in response to longitudinal movement of the elongated steering arm rotating the bifurcated steering crank and displacing the connecting rod.

8. The steerable towing device of claim 7 further comprising a first connecting point located centrally on said frame and positioned in alignment with center pivot point of said bifurcated steering crank, said connecting point being adapted to have a towed vehicle removeably connected thereto wherein a said towed vehicle is pulled in response to a towing means through a turn while maintaining alignment between the connecting point, center pivot point of the bifurcated steering crank and center line of the axle; and a second connecting point located between said frame and a towed vehicle to permit movement in roll direction and to restrict movement in a pitch and yaw direction.

9. A steerable towing apparatus comprising a frame having at least one exterior section, a portion of which extends therebelow;

an elongated towing member positioned to extend from the interior of the frame and past the exterior section;

a steerable wheel assembly having a pair of axially aligned wheels fixedly connected to the frame and a steering assembly, said pair of axially aligned wheels being positioned with the center line thereof being positioned substantially perpendicular to said elongated towing member, said steering assembly having a steering crank arm pivotally mounted on said frame equidistant between the axially aligned wheels and under said frame, said steering crank arm having substantially equal extended arm sections emanating from the pivot point with the end of one extended arm section pivotally connected to the steering assembly, said assembly further including an integral drag arm and tie rod connecting arm assembly with the end of the drag arm positioned opposite the end of the tie rod connecting arm and with each of said drag arm and tie rod connecting arm being positioned at an acute angle from the center line of the two axially aligned wheels for steering one of the two wheels; said end of the drag arm being pivotally connected to the other end of the connecting rod and parallel to and equal in length to the other extended arm section;

a tie rod connecting arm positioned at an acute angle from the center line of the two axially aligned wheels with the end of the tie rod connecting arm extending in a direction opposite to the drag arm for steering the other of the two wheels; and a tie rod extending between the ends of each tie rod connecting arm;

said extended arm sections having a selected obtuse angle therebetween to cause the arc traversed by the one extended arm connected to the steering assembly to be greater when turning the steering assembly for a left turn than the arc traversed when turning the steering assembly for a right turn; and a steering member extending substantially parallel to and spaced in a horizontal distance from said towing member and pivotally connected to the end of said other extended arm section, said steering member being adapted to displace said other extended arm section in a longitudinal direction, the displacement thereof being determined by the radius of a turn.

10. The steerable towing apparatus of claim 9 wherein said frame comprises an "A" shaped interior section; and a ball adapted to receive a socket member of a towed vehicle attached to the cross member of said "A" shaped interior section and positioned thereon such that the center line of the ball and center member of the "A" shaped frame is in alignment with the center pivot point of said bifurcated steering crank.

11. The steerable towing apparatus of claim 9 wherein said frame comprises a single elongated support member positioned substantially parallel to the center line of the axially aligned wheels and slightly forward toward the one exterior section relating to the center line of the center pivot point and a tow plate attached to and extending substantially perpendicular to said support member from said one exterior section under the frame to a point above the center line of said center pivot point of said bifurcated steering crank; and a ball adapted to receive a socket member of a towed vehicle attached to that part of the support member positioned above the bifurcated steering crank with the center line of the ball in alignment with the center line of said center pivot point.

12. The steerable towing apparatus of claim 10 further comprising decoupling means connected between the rear part of the frame and a towed vehicle to enable the towed vehicle to be removeably connected to the steerable device for restricting movement therebetween in a pitch and yaw direction.

13. The steerable towing apparatus of claim 12 wherein said decoupling means is a pivot-pin and pivot-socket assembly.

14. The steerable towing apparatus of claim 11 wherein the elongated towing member is in the form of a "V" shaped draw bar.

15. The steerable towing apparatus of claim 11 wherein the elongated towing member is a single tongue.

16. The steerable towing apparatus of claim 15 wherein the elongated towing member comprises a "V" shaped draw bar and single tongue assembly pivotally attached to said one exterior section of the frame.

17. The steerable towing apparatus of claim 15 wherein said steering member and said "V" shaped draw bar and tongue assembly each have a socket adapted to be removeably connected to a two ball hitch on a towing means.

* * * * *